April 2, 1935.   G. P. LUCKEY   1,996,339
CHRONOMETRIC TACHOMETER
Filed Nov. 11, 1933   3 Sheets-Sheet 1
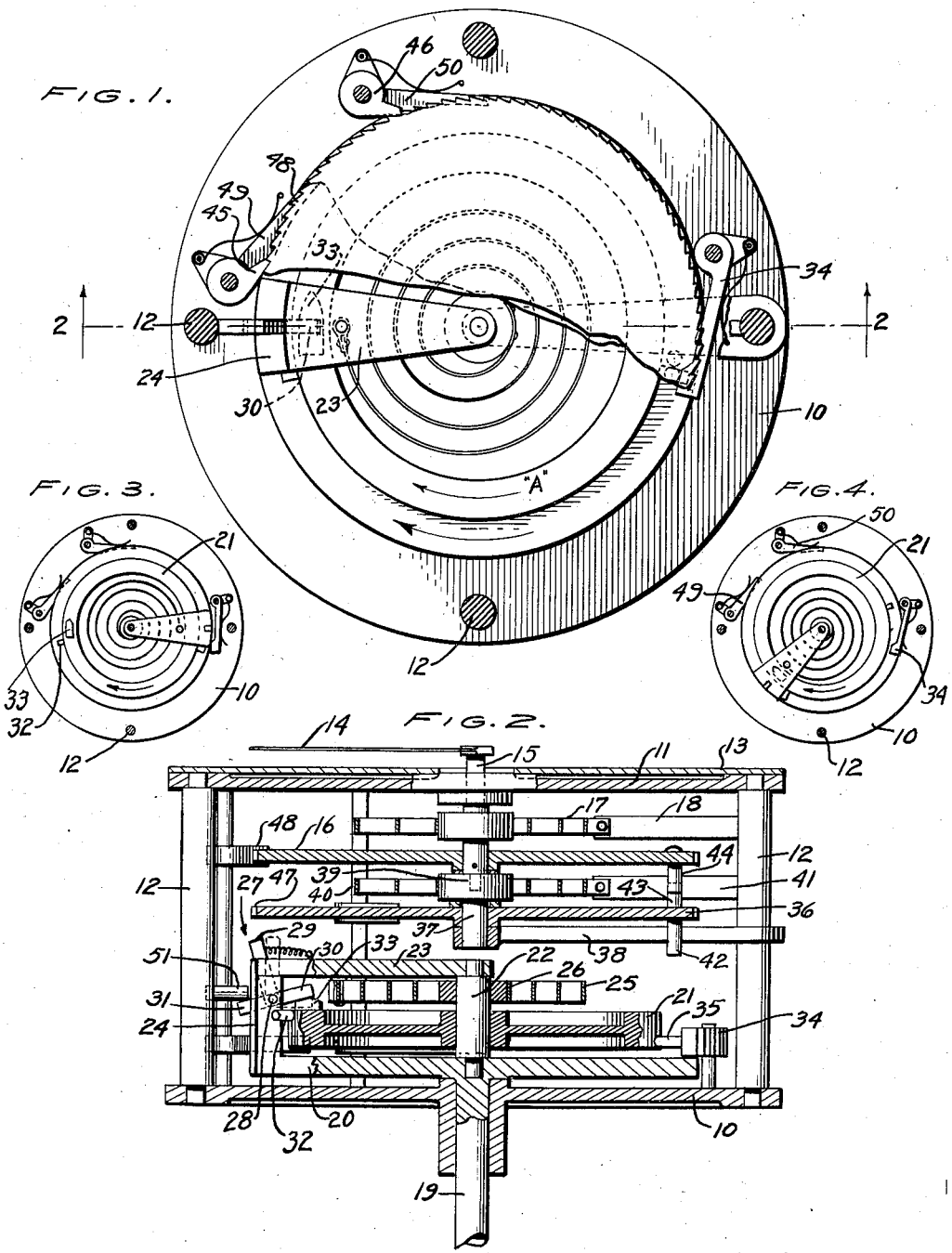
INVENTOR
GEORGE P. LUCKEY
ATTORNEYS April 2, 1935.  G. P. LUCKEY  1,996,339
CHRONOMETRIC TACHOMETER
Filed Nov. 11, 1933  3 Sheets—Sheet 2
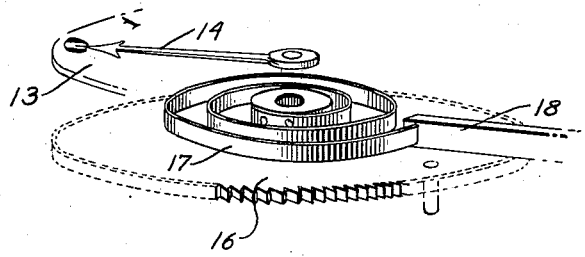
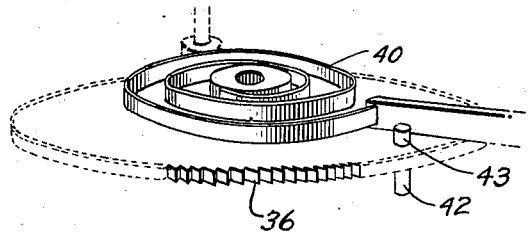
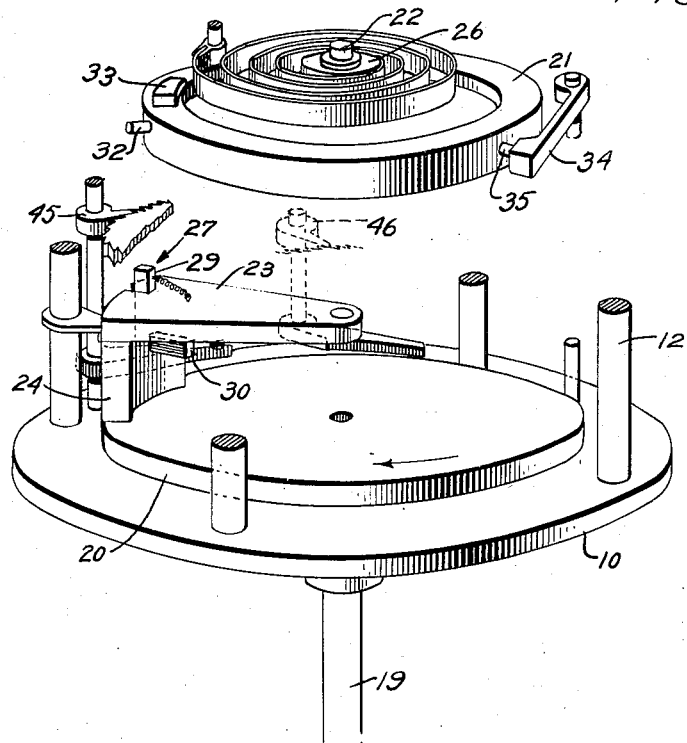
FIG. 5.
INVENTOR
GEORGE P. LUCKEY April 2, 1935.  G. P. LUCKEY  1,996,339
CHRONOMETRIC TACHOMETER
Filed Nov. 11, 1933  3 Sheets-Sheet 3

INVENTOR
GEORGE P. LUCKEY
BY
ATTORNEYS

Patented Apr. 2, 1935

1,996,339

UNITED STATES PATENT OFFICE 1,996,339

CHRONOMETRIC TACHOMETER

George P. Luckey, Lancaster, Pa.

Application November 11, 1933, Serial No. 697,680

14 Claims. (Cl. 264—21)

The present invention relates generally to speed indicators, and has as one of the primary objects, a chronometric tachometer intended for the measurement of speed, especially characterized by the fact that with this apparatus, any speed which is to be measured is defined by the position of the meeting point of two moving elements to which a rotary movement is imparted, starting from different points, at the same instant, the one having imparted to it an angular movement, the speed of which is constantly equal or proportionate to that which it is desired to measure, and the other having imparted to it, when released, an angular displacement, the lapse time interval of which after release, is constant for all speeds of the first moving element.

A further object of the present invention is to provide a chronometric tachometer in which the angular displacement of the driven member is timed by a balance wheel and a hair spring in which the time is determined by the lapse of time required for the balance wheel to move from a position of maximum tension in the hair spring to a zero tension in the hair spring, and thus is always constant. According to the present invention, the hair spring is wound during a portion of the revolution of the driving member, driven proportional to the speed being measured, and the balance wheel is released during another portion of its revolution. An arm on the driving member picks up an indicating mechanism when the driving member is in a predetermined position in its revolution at the same instant that the balance wheel, whose hair spring is wound by the driving member, is released. This indicating mechanism is carried forward until the balance wheel rotates so that the tension on the hair spring is zero, at which instant the indicating mechanism is released and the driving member continues its rotation. Thus, the indicating mechanism is carried forward during a constant interval of time and the distance that it travels is proportional to the speed being measured.

A still further object of the present invention is the provision of an indicator of the above character, which will be extremely accurate and positive in operation and which is capable of easy assembly and dis-assembly of parts without involving any substantial loss in time in assembling the parts in their proper coordination.

A still further object of the present invention is the reduction of the number of operating parts of the instrument and the provision of an instrument of this character which will have parts of simple form which may be accurately assembled.

Other objects and advantages of my invention will be more fully discussed and set forth in the following detailed description and claims which relate to preferred embodiments of my invention, chosen for the purpose of illustration.

In the drawings:

Fig. 1 is a top plan view partly in section of one embodiment of my invention.

Fig. 2 is a sectional view taken on the line 2—2 of Fig. 1.

Fig. 3 is intended as a diagrammatic view, illustrating the relative position between the balance wheel and driving member at the instant of release of the balance wheel.

Fig. 4 is a diagrammatic view similar to that shown in connection with Fig. 3, illustrating the relative positions of the driving member and balance wheel with the hair spring in zero position.

Fig. 5 represents a diagrammatic view in perspective of the operating parts shown in the modification illustrated in Fig. 1 with the parts in an exploded condition.

Figure 6:
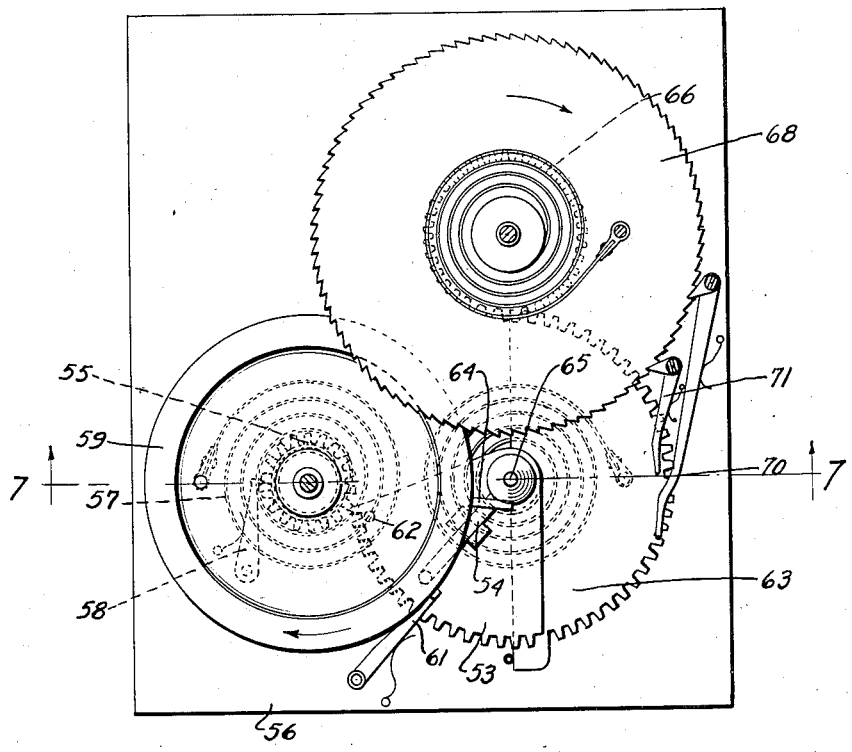
Fig. 6 is a modified form of the invention incorporating the principles embodied in Fig. 1.

Referring more particularly to the drawings wherein corresponding parts are designated by like numerals throughout the several views, the chronometric tachometer in one embodiment of my invention herein illustrated, comprises generally, as in Figs. 1 and 2, a base plate 10 and a top plate 11 which are spaced apart by spacing studs 12. The top plate 11 serves as a mount for an indicating dial 13 which cooperates with the indicator needle 14 fixed upon the indicator shaft 15 which is journaled in the top plate 11. Rigid with the shaft 15 is an indicator wheel 16 which is pinned to the shaft 15. Firmly attached to the indicating wheel 16 is one end of an indicating spring 17, the other end of which is fixed into position to one of the spacing studs 12 by a fastener 18. This indicator spring 17 tends to rotate the indicator in a counterclockwise direction, as viewed from the top in Fig. 1.

A drive shaft 19 is journaled within the base plate 10, and is adapted to be connected to the device, the speed of which is to be measured. This drive shaft 19 is rigid with a driving member 20 which carries a balance wheel 21 mounted upon a shaft 22 bearing centrally within the driving member 20, and a top plate 23 which is fixed to the driving member 20 by a post 24 located adjacent the peripheral edge of the driving member 20.

The driving member 20 also carries a hair spring 25 which is fixed at its one end as indicated by the numeral 26 to the balance wheel 21, the other end of which is anchored to the top plate of the driving member. The post 24 of the driving member 20 is provided with a bellcrank lever 27 pivotally secured to the post 24 by the pin 28. This bellcrank lever 27 includes the vertical arm 29 and the horizontally extending arms 30 and 31. When there is no tension on the hair spring 25, a pin 32 on the peripheral edge of the balance wheel 21 rests against the post 24 as shown in Fig. 2. At the same time, a camming element 33 on the balance wheel 21 raises the horizontal arm 30 of the bellcrank lever 27 so that the vertical portion 29 is thrown into the angular position illustrated in Fig. 2. A spring controlled stop arm 34 is provided on the other side of the base plate 10 which is adapted for engaging a pin 35 provided on the peripheral edge of the balance wheel as shown in Fig. 2.

A holding wheel 36 is positioned beneath the indicating wheel 16 in the manner illustrated in Fig. 2. This holding wheel 36 is provided with a shaft 37 which bears in a supporting member 38 at its lower end. The upper end of the shaft 37 is provided with an internal circular bore 39 for receiving the lower end of the indicator shaft 15. The hub portion of the holding wheel 36 has secured thereto the one end of a spiral spring 40, the other end of which is fixed in position by means of a fastener 41 which is attached to one of the spacing studs 12 heretofore mentioned. This spring can rotate the holding wheel in a counterclockwise direction as viewed from the top in Fig. 1.

The operation of the device is as follows:

As the driving member 20 revolves, the stop arm 34 which is pivoted to the base plate 10 picks up the pin 35 on the balance wheel 21 and holds the balance wheel stationary while the driving member 20 revolves one-half revolution, thus putting the hair spring 25 under tension. At the end of one-half revolution of the driving member 20, the post 24 comes into contact with the stop arm 34 throwing it out of mesh with the pin 35 and releasing the balance wheel 21. At the same time the vertical arm 29 of the bellcrank lever 27 heretofore mentioned, now in a vertical position, picks up a pin 42 on the bottom of the holding wheel 36 at the zero position of the holding wheel so that it is now carried forwardly with the driving member. The stop arm 34 is cammed over the outside of the post 24 as the driving member rotates and falls back into position by means of the spring controlling the same in order to pick up the pin 35 as soon as the post 24 has been carried past. The balance wheel 21 being released, moves relative to the driving member 20 in the direction of the arrow "A" until when the tension on the hair spring 25 is zero, it is stopped by the pin 32 striking the post 24. At the same time, the camming element 33 on the balance wheel raises the horizontal portion 30 of the bellcrank lever 27 moving the vertical portion 29 out of mesh with the pin 42 on the holding wheel 36 and allowing the driving member to continue its revolution without carrying with it the holding wheel 36. It will thus be seen that the holding wheel 36 is picked up by the driving member and carried with it for a given short interval of time for each revolution of the driving member. This time is that required for the balance wheel to travel from a position with the hair spring wound one-half turn to a position with no tension in the hair spring and thus is constant, being determined solely by the moment of inertia of the balance wheel and the angular torque of the hair spring.

The holding wheel 36 thus indicates the distance traveled by the driving member in a predetermined time interval and is proportional to the R. P. M. of the driving member 20. The holding wheel 36 in moving forward carries with it the indicating wheel 16 carrying the pointer. This is accomplished by providing an upper pin 43 adjacent the peripheral edge of the holding wheel which engages a depending pin 44 provided adjacent the peripheral edge of the indicating wheel 16. Two pawls 45 and 46 bear on the teeth 47 and 48 on the circumference of the holding wheel 36 and indicating wheel 16 normally holding them in the position of maximum indication.

In case the indication is decreasing, the pointer assumes the correct indication as follows:

During the time the balance wheel 21 is held stationary by the stop arm 34, the post 24 on the driving member strikes an arm 49 on the pawl 45 throwing it out of mesh with the indicating wheel 16 and permitting the spring 17 to return it toward zero until the pin 44 on the bottom of the indicating wheel meets the upper pin 43 on the top of the holding wheel. As the driving member continues to revolve, the post 24 passes the arm on the pawl 45 allowing it to mesh with the wheel 16 and holding it. The post 24 then strikes a similar arm 50 on the pawl 46 releasing the holding wheel 36 which thereafter returns to a zero setting ready to be picked up by the driving member when it passes zero when the balance wheel is released. However, before this occurs, the post 24 has passed the arm on the pawl 46 and the holding pawl on the holding wheel 36 is again in operation. The pointer thus indicates the distance moved by the driving member during a short period of time of each revolution of the balance wheel.

To protect the mechanism in case the driving member is running at a higher speed than that for which the tachometer is designed, a trip 51 is arranged on the casing automatically tripping the arm 31 of the bellcrank lever after the holding wheel has been carried forward one-half revolution. Thus by suitable means the indication is held. While the holding wheel is held at its maximum deflection, the pointer is released and a spring on the pointer which corresponds to the spring on the indicating wheel carries it to the position assumed by the holding wheel; the pointer or the indicating wheel is thus held and the holding wheel released and returned to a zero setting. The holding is accomplished by the ratchet mechanism heretofore mentioned, which is released by the driving member during the time that the hair spring on the balance wheel is being wound.

Figure 7:
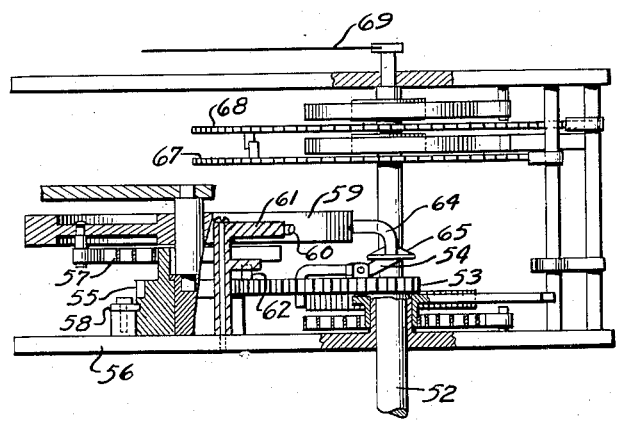
Fig. 7 is a vertical section taken on the line 7—7 of Fig. 6.

Another mechanism for accomplishing the results obtained in connection with Figs. 1 and 2 is shown in Figs. 6 and 7. The essential differences between this modification of the invention and that shown in connection with Figs. 1 and 2 resides in the following facts:

a. The balance wheel is not mounted on the rotating member but is mounted on the casing.

b. The balance wheel makes one revolution instead of one-half revolution at the instant of its release.

c. The hair spring is wound one revolution for each revolution of the driving member through the medium of an intermittent gear.

d. The holding and indicating mechanisms are on a shaft separate from the driving member, being geared up so that they make two revolutions for one or one-half revolution of the indicating member.

A description as to the mechanism involved and the operation embodied in Figs. 6 and 7 of the drawings is as follows:

A shaft 52 revolving proportional to the speed to be measured carries a gear sector 53 and a release arm 54 which operate an indicating holding mechanism. Once each revolution this gear sector 53 meshes with a pinion 55 carried by the base plate 56. This pinion carries one end of the balance wheel hair spring 57. The pinion 55 is turned one revolution each time it is engaged by the gear sector 53, thus putting the hair spring under tension. The pinion 55 is prevented from rotating backward by means of a spring controlled catch 58 which engages in a slot on the body of the pinion 55 after it has been turned one revolution by the gear sector.

During the winding of the hair spring, the balance wheel 59 is held by a pin 60 mounted on the circumference thereof engaging with a stop arm 61 which is pivotally mounted on the base plate 56. Following the winding of the hair spring, a pin 62 on the peripheral edge of the gear sector 53 contacts with the stop arm 61 heretofore mentioned and temporarily moves the same out of engagement with the pin 60, thus releasing the balance wheel 59 which starts to revolve under the influence of the wound hair spring. At the same time the release arm 54 which projects under the gear sector 53 as shown in Fig. 7, picks up a gear sector 63 and carries it forward until the balance wheel has made one revolution, at which time a pin 64 on the circumference of the balance wheel in revolving toward the center of the sector shaft 52 depresses a button 65 on the inner end of the release arm 54, thus releasing the holding sector 63. This holding sector meshes with a gear 66 on the shaft of the holding wheel 67 so that this wheel is also carried forwardly with the motion of the holding gear sector 63. On the same shaft is an indicating wheel 68 bearing the pointer 69. These wheels are operated in the same manner as that described above in connection with the indicating mechanisms of Figs. 1 and 2, the holding pawls 70 and 71 being released in the proper sequence by the engagement thereby of the pin 62 on the gear sector 53. This operation is repeated for each revolution of the driving member.

From the foregoing description, it will be apparent that the apparatus involves a decided improvement over the conventional chronometric tachometers in that the conventional slip spring and escapement are eliminated. Also the errors due to the meshing of the timing wheel are eliminated. It should also be noted that the indicating mechanism is operated from the driving member where a positive force is available rather than the conventional escape wheel. The balance wheel used for timing is free to swing and its only operation is to lift a small, light arm at the end of its swing just before it is brought to a stop and at a time when the kinetic energy of the balance wheel and its velocity are at a maximum.

I claim:

1. An apparatus for the measurement of speed comprising, a driving member, indicating means associated with said driving member, means for rotating said driving member in a positive direction at a speed proportional to that it is desired to measure, a rotatable timing member of constant speed, means for periodically effecting a predetermined relative angular movement between the driving member and said timing member and for releasing said timing member, means controlled by said driving member for actuating said indicating means at the instant of release of said timing member and further means for periodically releasing said indicating mechanism.

2. An apparatus for the measurement of speed, comprising a driving member, indicating means associated with said driving member, means for rotating said driving member at a speed proportional to that it is desired to measure, a rotatable timing member of constant speed, means for holding said timing member against rotation during a predetermined increment of angular movement of said driving member, means associated with said first mentioned means for periodically releasing said timing member for movement in a positive direction, means controlled by said driving member for engaging said indicating means at the instant of release of said timing member and further means controlled by said timing member for periodically releasing said indicating means.

3. An apparatus for the measurement of speed, comprising, a driving member, indicating means associated with said driving member, means for rotating said driving member in a positive direction at a speed proportional to that it is desired to measure, a periodically released timing member, spring means interconnecting said timing member and driving member for effecting a synchronous angular displacement of the timing member relative to said driving member upon release of said timing member, means associated with said driving member for actuating said indicating means at the instant of release of said timing member, and further means operated by movement of said timing member for periodically releasing said indicating means.

4. An apparatus for the measurement of speed, comprising, a driving member, indicating means associated with said driving member, means for rotating said driving member in a positive direction at a speed proportional to that it is desired to measure, a periodically released timing member having limited rotative movement with respect to said driving member, spring means interconnecting said timing member and driving member for effecting a synchronous angular displacement of the timing member relative to said driving member upon release of said timing member, means associated with said driving member for actuating said indicating means at the instant of release of said timing member, and further means operated by movement of said timing member for periodically releasing said indicating means when said timing member has reached the limit of its rotative movement.

5. An apparatus for the measurement of speed comprising, a driving member, indicating means associated with said driving member, means for rotating said driving member in a positive direction at a speed proportional to that it is desired to measure, a rotatable timing member having limited rotative movement with respect to said driving member, means controlled by said driving member for periodically releasing said timing member, spring means interconnecting said timinging member and driving member for effecting a synchronous angular displacement of the timing member relative to said driving member upon release of said timing member, means associated with said first mentioned means for actuating said indicating means at the instant of release of said timing member and further means operated by movement of said timing member for periodically relasing said indicating means when said timing member has reached the limit of its rotative movement.

6. An apparatus for the measurement of speed comprising, a driving member, indicating means associated with said driving member, means for rotating said driving member in a positive direction at a speed proportional to that it is desired to measure, a rotatable timing member having limited rotative movement with respect to said driving member, means controlled by said driving member for periodically releasing said timing member, spring means interconnecting said timing member and driving member for effecting a synchronous angular displacement of the timing member relative to said driving member upon release of said timing member, means associated with said first mentioned means for actuating said indicating means at the instant of release of said timing member and further means carried by said timing member cooperating with said last mentioned means for periodically releasing said indicating means when said timing member has reached the limit of its rotative movement.

7. An apparatus for the measurement of speed comprising, a driving member, indicating means associated with said driving member, means for rotating said driving member in a positive direction at a speed proportional to that it is desired to measure, a periodically released timing member having a limited rotative relative movement dependent on the angular displacement of said driving member, spring means interconnecting said timing member and driving member for effecting a synchronous angular displacement of the timing member relative to said driving member upon release of said timing member, an arm carried by said driving member for periodically releasing said timing member, means associated with said driving member for actuating said indicating means at the instant of release of said timing member, and further means operated by movement of said timing member for periodically releasing said indicating means when said timing member has reached the limit of its rotative movement.

8. An apparatus for the measurement of speed comprising, a driving member, indicating means associated with said driving member, means for rotating said driving member in a positive direction at a speed proportional to that it is desired to measure, a periodically released timing member having a limited rotative relative movement dependent upon the angular displacement of said driving member, spring means interconnecting said timing member and driving member for effecting a synchronous angular displacement of the timing member relative to said driving member upon release of said timing member, an arm carried by said driving member for periodically releasing said timing member and including means for simultaneously actuating said indicating means at the instant of release of said timing member, and further means carried by said timing member cooperating with said last mentioned means for periodically releasing said indicating means when said timing member has reached the limit of its rotative movement.

9. An apparatus of the class described, comprising a driving member, indicating means associated with said driving member, means for rotating said driving member in a positive direction at a speed proportional to that desired to measure, a periodically released timing member having limited rotative relative movement dependent upon the angular displacement of said driving member, spring means interconnecting said timing member and driving member for effecting a synchronous angular displacement of the timing member relative to said driving member upon release of said timing member, an arm carried by said driving member for periodically releasing said timing member, means carried by said arm for actuating said indicating means simultaneously as said timing member is being released, and further means carried by said timing member cooperating with said last mentioned means for periodically releasing said indicating means when said timing member has reached the limit of its rotative movement.

10. An apparatus for the measurement of speed, comprising, a driving member, indicating means associated with said driving member, means for rotating said driving member in a positive direction at a speed proportional to that it is desired to measure, a periodically released timing member, spring means interconnecting said timing member and driving member for effecting a synchronous angular displacement of the timing member relative to said driving member upon release of said timing member, an arm carried by said driving member for periodically releasing said timing member and including means for simultaneously actuating said indicating means at the instant of release of said timing member, a stop carried by said timing member adapted for engaging with said arm for limiting the rotative movement of said timing member when released, and further means cooperating with said actuating means for periodically releasing said indicating means when said timing member has reached the limit of its rotative movement.

11. An apparatus for the measurement of speed comprising, a driving member, indicating means associated with said driving member, means for rotating said driving member in a positive direction at a speed proportional to that it is desired to measure, a periodically released timing member, spring means interconnecting said timing member and driving member for effecting a synchronous angular displacement of the timing member relative to said driving member upon the release of said timing member, an arm carried by said driving member for periodically releasing said timing member and including means for simultaneously actuating said indicating means at the instant of release of said timing member, a stop carried by said timing member adapted for engaging with said arm for limiting the rotative movement of said timing member when released, and a tripping member carried by said timing member for periodically releasing said indicating means when said stop engages said arm.

12. An apparatus for the measurement of speed, comprising, a driving member, indicating means associated with said driving member, means for rotating said driving member in a positive direction at a speed proportional to that it is desired to measure, a timing member having limited rotative movement with respect to said driving member, means for holding said timing member against rotation for a predetermined angular displacement of said driving member, means carried by said driving member for periodically releasing said timing member including means for simultaneously actuating said indicating means and further means carried by said timing member cooperating with said last mentioned means for periodically releasing said indicating means when said timing member has reached the limit of its rotative movement.

13. In an apparatus for the measurement of speed as set forth in claim 12, means for automatically disengaging said actuating means from said indicating means upon predetermined maximum movement of the latter.

14. In an apparatus for the measurement of speed as set forth in claim 12, a camming member adjacent said driving member for automatically disengaging said actuating means from said indicating means upon predetermined maximum movement of the latter.

GEORGE P. LUCKEY.